No. 692,978. Patented Feb. 11, 1902.
T. P. BROWN.
GOVERNING DEVICE FOR PNEUMATIC PIANO PLAYERS.
(Application filed May 29, 1901.)
(No Model.) 2 Sheets—Sheet 1.
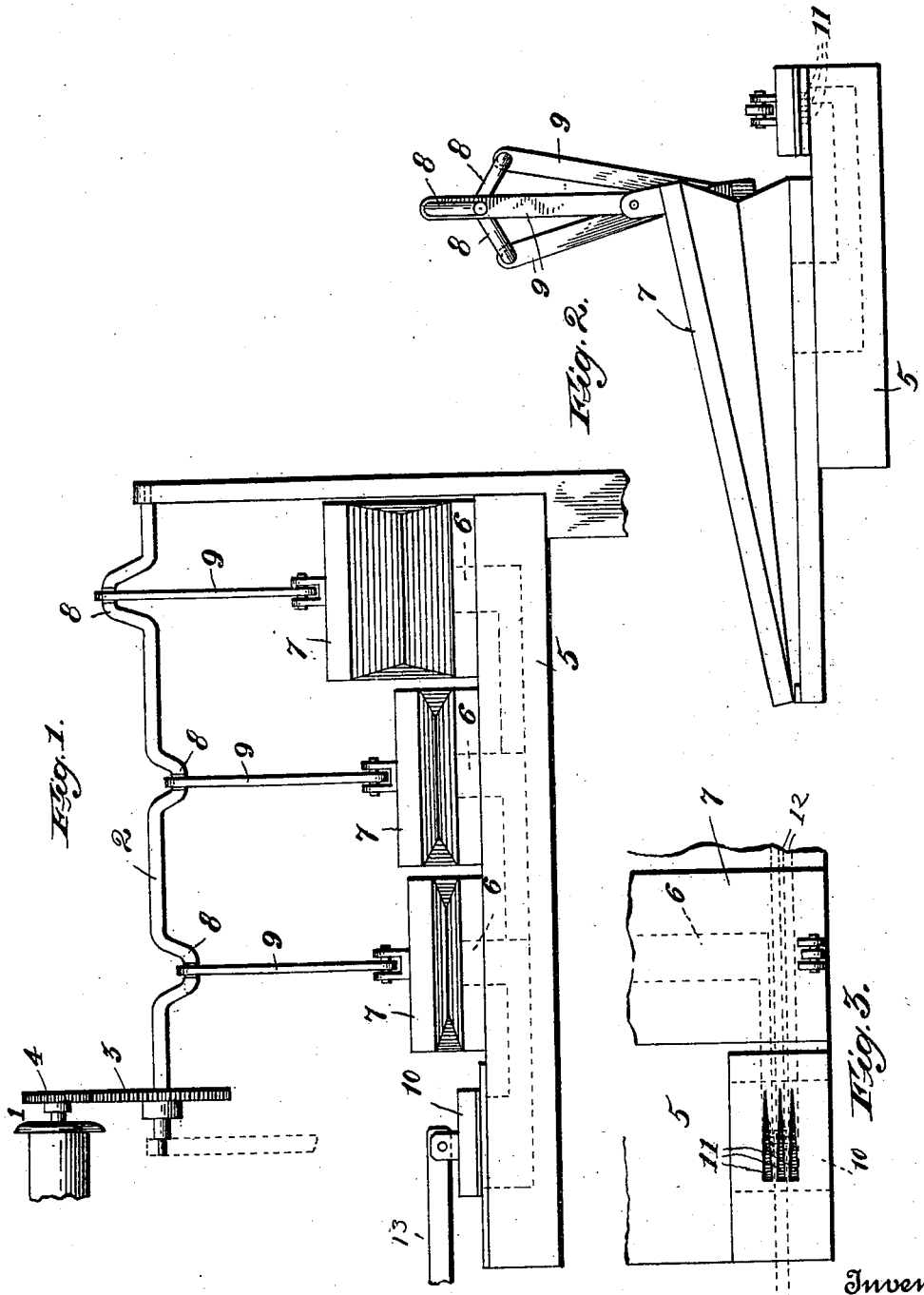
Witnesses
Inventor
Theodor P. Brown,
By G. Howlett Davis
Attorney No. 692,978. Patented Feb. 11, 1902.
T. P. BROWN.
GOVERNING DEVICE FOR PNEUMATIC PIANO PLAYERS.
(Application filed May 29, 1901.)
(No Model.) 2 Sheets—Sheet 2.
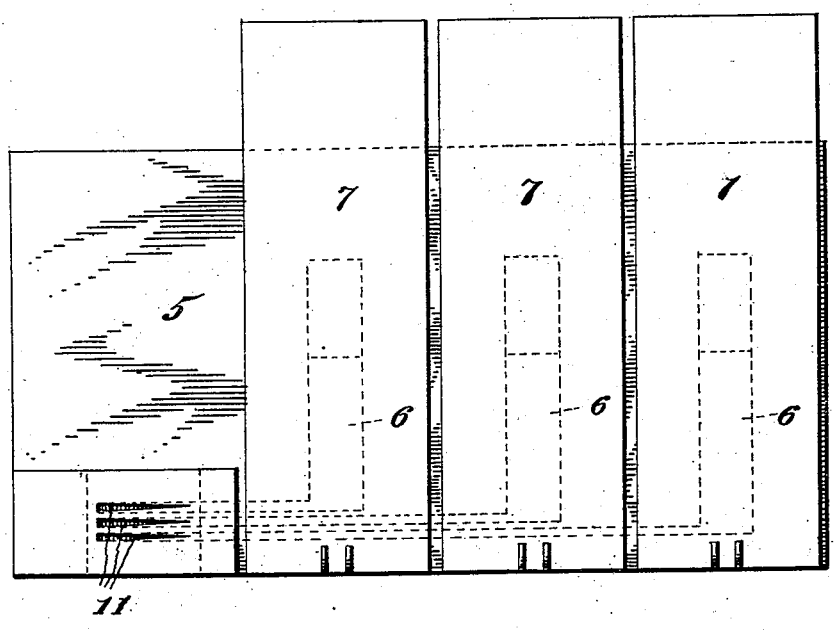
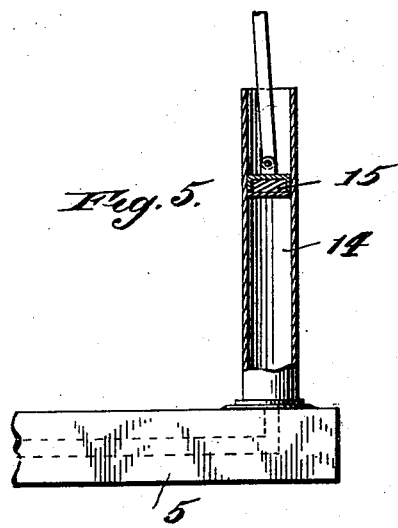

UNITED STATES PATENT OFFICE.

THEODORE PARKER BROWN, OF WORCESTER, MASSACHUSETTS.

GOVERNING DEVICE FOR PNEUMATIC PIANO-PLAYERS.

SPECIFICATION forming part of Letters Patent No. 692,978, dated February 11, 1902.

Application filed May 29, 1901. Serial No. 62,344. (No model.)

*To all whom it may concern:*

Be it known that I, THEODORE PARKER BROWN, a citizen of the United States, residing at Worcester, in the county of Worcester and State of Massachusetts, have invented certain new and useful Improvements in Governing Devices for Pneumatic Piano-Players; and I do hereby declare the following to be a full, clear, and exact description of the invention, such as will enable others skilled in the art to which it appertains to make and use the same.

This invention relates to improvements in tempo instrumentalities or governing devices for use in automatic piano-players, and has for its object the provision of means whereby the speed of the moving music-sheet over the tracker may be more easily and perfectly controlled from the tempo-stop of the player, the governing means being of such a character that any variation of speed within a wide range may be secured without the use of the mechanical governors which are sometimes used and which on account of the high speed necessary to their effectiveness are objectionable, because of the humming noise which they produce.

The present governor, which may properly be termed a "pneumatic-governor," consists, briefly stated, of a governor-shaft which may be suitably connected, as by gearing or belting, with a shaft controlling the movement of the music-sheet, the prime motor for driving the music-sheet being of any suitable type, either spring, weight, or electric, said governor-shaft being provided with one or more cranks which are angularly placed relative to one another if there be more than one. These cranks or eccentrics are connected by means of suitable links or pitmen with the working flaps of power-pneumatics which are in communication with a chamber closed but for a series of ports, varying in area throughout their lengths, one for each pneumatic, which ports are controlled by a valve so arranged as to allow the shutting off of more or less of the port-openings and the admission of a greater or less volume of air to the chamber and pneumatics, thus regulating to a nicety the period of collapse and distention of the pneumatics, the speed of the governor-shaft with which said pneumatics are connected, and through it the speed of the shaft to be regulated and the music-sheet.

In the drawings which accompany and form a part of this specification I have illustrated one form of carrying my invention into effect, and in said drawings—

Figure 1 is a front view of the apparatus, showing the pneumatics and coöperating parts disposed as in the preferred construction. Fig. 2 is a side view of the governor-pneumatics, the governor-shaft, and their connecting-links. Fig. 3 is a detail plan view of a portion of the chamber which supports the pneumatics and with which they are in communication to illustrate the port-openings, valve, and valve-seat. Fig. 4 is a plan view of the entire chamber, with its superposed pneumatics; and Fig. 5 is a view of a different form of pneumatic-controlling device from that shown in the other views.

Referring to the drawings by numerals, like characters referring to like parts in the several views, 1 indicates the shaft to be governed, which may be the driving-shaft of a spring, weight, or electric motor, or any of the shafts controlling the movement of the music-sheet. Connected with said shaft 1 is a governor-shaft 2, the connections between the two shafts being shown in the present instance as consisting of two gears 3 and 4, mounted on the shaft 2 and the shaft 1, respectively. It will be seen, therefore, that the two shafts must rotate together and that the speed of one is dependent upon the other, so that if there be any retardation of the governor-shaft 2 a corresponding slowing down of the shaft 1 and the music-sheet controlled thereby will result. Mounted in convenient relation to the said governor-shaft 2 is a base-board 5, having chambers 6 formed therein, said chambers 6 being in communication with a series of pneumatics 7, mounted on said base-board 5, said pneumatics being of the ordinary type of power-pneumatics and provided with a fixed flap and a working flap, as is usual. The said pneumatics are connected with a series of cranks 8 on the governor-shaft 2 by means of links 9, said cranks 8 being angularly placed relative to one another, so that the throw of the several cranks will not be coincident, but successive.

It will be seen that with the above construction and combination of parts the pneumatics 7 will be collapsed and distended in succession as the governor-shaft 2 is rotated and the cranks 8 make their throw. It will also be apparent that unless the said pneumatics 7 collapse and distend with but little resistance they will retard the rotation of the governor-shaft 2 and the shaft 1, to which it is geared.

In order to vary the resistance exerted by the pneumatics 7 in collapsing and distending, a controlling device is used, which consists of a valve 10, arranged to cover and control port-openings 11, from which passages 12 lead to the chambers 6, with which the said pneumatics 7 are in communication, there being a series of port-openings 11, one for each chamber and pneumatic, all controlled by a single valve. The port-openings are preferably shaped as shown in the drawings, being wedge-shaped, or narrower at one end than at the other. Said valve 10 is connected by means of a link or connecting-rod 13 with the tempo-stop of the player, so as to be under the control of the operator, and as it is shifted over the port-openings more or less air is admitted to the chambers 6 and the pneumatics 7, according to the area of the port-openings uncovered. This, it will be obvious, will cause the pneumatics 7 to collapse and distend quickly or slowly, such collapse and distention being determined by the volume of air admitted through the port-openings, and said pneumatics 7 will exert a corresponding drag or retardation on the governor-shaft 2 and the shaft 1, geared thereto. It will thus be seen that the governing device which I have provided is one which is capable of fine gradations of speed, is quickly and easily controlled, and is absolutely noiseless in its operation, so that no action of the governor will interfere with or detract from the music being produced, as is the case with some of the noisy mechanical governors now in use.

While I have shown a series of pneumatics, I do not wish to be understood as limiting my invention to any particular number, as that may be varied to suit the conditions or requirements of the instrument. In fact, I do not limit my invention to any particular type of pneumatic-controlling device, as other pneumatic devices may be substituted therefor with equally good results, and I have shown in Fig. 5 a device which is an apparent variation of the pneumatic devices shown in the other figures. In this type of pneumatic a cylinder 14 is provided, said cylinder taking the place of the flap-pneumatic hereinbefore described and being provided with a piston 15, which is connected with the crank of a governor-shaft by means of a link connection similar to that shown in Fig. 1, the lower end of said cylinder 14 communicating with a port-opening controlled by means of a valve which is actuated from the tempo-stop of the player, precisely as in the form shown in the other views. The operation of this pneumatic device is similar to that of the other type, the piston moving fast or slow, according to the volume of air admitted to the cylinder through the port, the volume of air being determined by the position of the valve controlled from the tempo-stop, and the rotation of the cranked governor-shaft will be retarded in proportion to the resistance exerted by the piston as it moves in and out of its cylinder. It will be understood that the cylinders may be duplicated to any desired number and connected in series to angularly-placed cranks on the governor-shaft, as in the other type.

Having thus described my invention, what I claim, and desire to secure by Letters Patent, is—

1. In a pneumatic-governing device, the combination with a driving-shaft, of a governor-shaft geared thereto, a base-board having a series of air-passages formed therein, said passages each terminating at one end in an elongated port-opening of varying area throughout its length, said series of ports being arranged in parallelism, pneumatic devices attached to said base-board and each having communication with one of the said air-passages, a cranked connection between said governor-shaft and each pneumatic device, and means contacting with said base-board and adapted to control the active area of said port-openings, substantially as described.

2. In a pneumatic-governing device, the combination with a driving-shaft, of a governor-shaft geared thereto, a base-board having chambers and air-passages formed therein, said air-passages leading from the chambers and each terminating in a V-shaped port-opening, said ports being arranged in parallelism each with its narrower end adjacent to the narrower end of the next port, pneumatic devices attached to said base-board and having communication with said chambers, a cranked connection between said governor-shaft and each pneumatic device, and a valve contacting with said base-board and movable back and forth over said port-openings to simultaneously control the active area thereof, substantially as described.

3. In a pneumatic-governing device, the combination with a driving-shaft, of a governor-shaft geared thereto and driven thereby, cranks on said governor-shaft, pneumatic devices operatively connected with said cranks, there being an independent air-passage leading from each of said pneumatics, said air-passages each terminating in an elongated port-opening of varying area throughout its length, the port-openings being arranged in parallelism each with its narrower end adjacent to the narrower end of the next port, and a valve movable back and forth over said port-openings to simultaneously control the active area thereof, substantially as described.

In testimony whereof I affix my signature in presence of two witnesses.

THEODORE PARKER BROWN.

Witnesses:
RUFUS B. DODGE, Jr.,
FRANK W. KING.